Patented Aug. 30, 1932

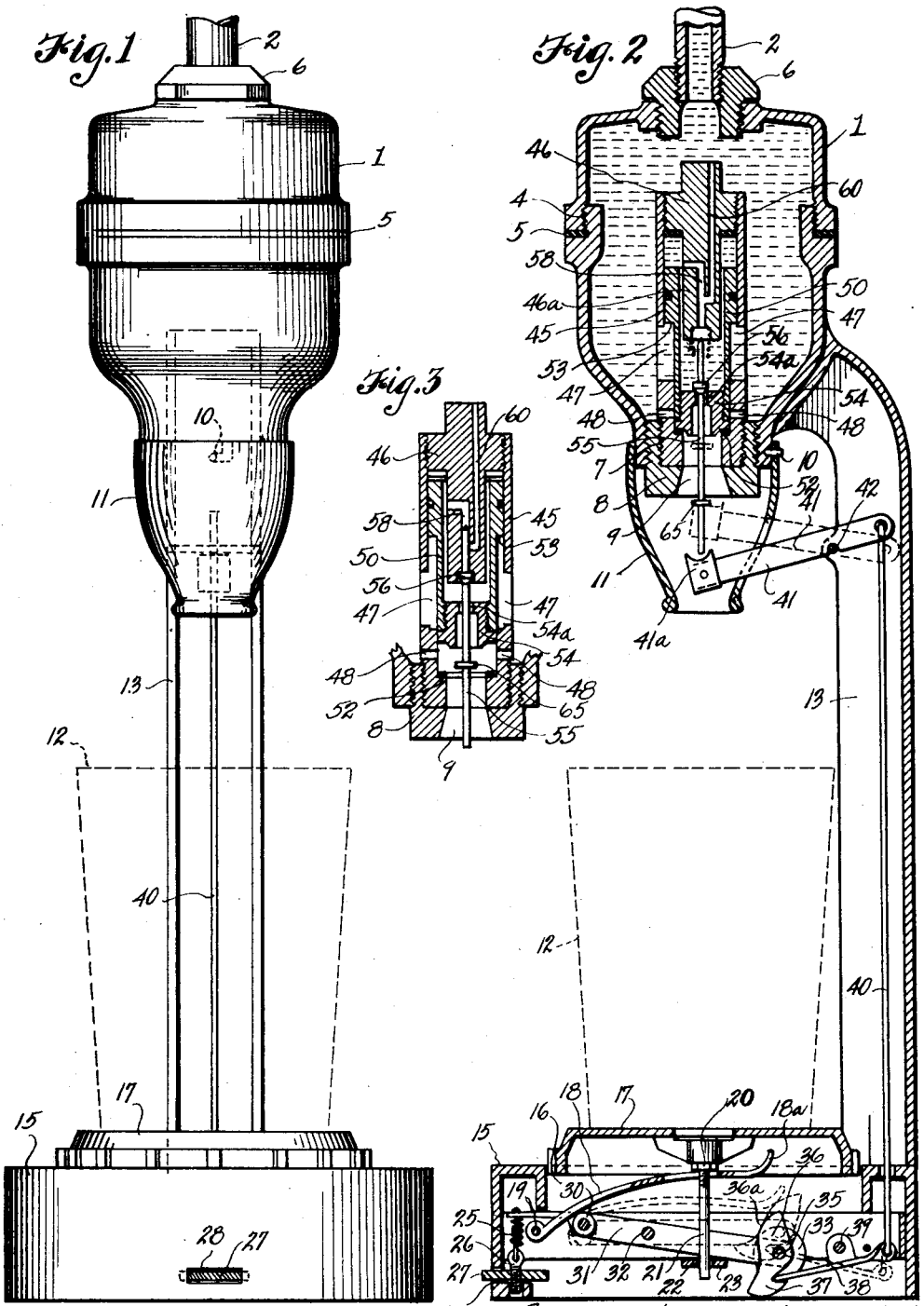

1,875,053

UNITED STATES PATENT OFFICE

ARTHUR LOCKE, OF TACOMA, WASHINGTON

AUTOMATIC WATER DISPENSING MEANS

Application filed February 24, 1930. Serial No. 430,564.

This invention relates to a dispensing means for water or other liquids, and it has reference in particular to a device for automatically dispensing definite quantities of water, such as for filling water glasses for use in restaurants, cafeterias, or similar places.

The principal object of the present invention is to provide a device of the above stated character employing a valve mechanism of novel construction for controlling the delivery and shutting off of water, a yieldable supporting plate on which a glass, or receptacle, is placed for filling, and mechanism operable incident to the initial depression of the plate due to the weight of the glass thereon, to open the valve for the delivery of water to fill the glass, and then operable by a farther depression of the plate following the delivery of a certain predetermined quantity of water into the glass to effect the closing of the valve to check the flow of water.

Another object of the present invention is to provide a valve mechanism which is controlled by reason of the application of weight of the glass and its contents, but is moved by reason of the pressure of the water from the source of supply.

Other objects of the invention reside in the specific details of construction of the valve mechanism proper, and its mode of operation.

Still further objects reside in the specific details of construction of the valve operating devices and their mode of operation and their relationship to the valve and its operating devices.

Still further objects reside in the adjusting and regulating means.

In accomplishing these and other objects of the invention I have provided the improved details of construction, the preferred forms of which are illustrated in the accompanying drawing, wherein—

Fig. 1 is a front elevation of an automatic water dispensing device embodying the present invention.

Fig. 2 is a vertical section of the same.

Fig. 3 is a sectional view of the valve mechanism proper showing the relationship of its parts during a water dispensing operation.

Referring more in detail to the drawing—

1 designates, in its entirety, the outer housing of the water dispensing valve to which, at the top, is connected a water supply pipe 2 leading from any suitable source of supply delivered under pressure. The housing 1 is composed of upper and lower sections threaded together, as at 4, with a suitable gasket 5 interposed to prevent leakage. The pipe 2, preferably, is connected to the housing through the medium of a nipple 6 and the housing is disposed in a vertical axial line.

Threaded into an opening 7 at the lower end of the housing is a nipple 8. This has a central passage 9 through which water is delivered from the housing 1, as will presently be described, and connected to the lower end of the housing by pin and slot connection, as at 10, is a spout 11 open at its lower end for the delivery of water into a glass, or receptacle, which for the purpose of filling, is placed directly below the spout. In Figs. 1 and 2, the glass, or receptacle, to be filled is designated in dotted lines at 12.

The housing 1 is supported by a vertical standard 13 that is rigidly fixed at its lower end to a horizontal base member 15. This base member preferably is of circular form and has a central opening 16 axially alined with the housing 1 and within which a horizontally disposed plate 17 is slidably contained to permit of its vertical movement under influence of the weight of a glass placed thereon and the weight of the water delivered into the glass.

The plate 17 is yieldingly supported by a swinging lever 18, which, near one end, is pivotally mounted on a horizontal pivot 19 and at its other end presses upwardly against a nut 20 that is threaded onto a guide stem 21 fixed in the plate 17 at the center thereof. The pin extends downwardly through an opening 22 in a cross bar 23 within the lower part of the base ring 15 to guide the plate and retain it in its horizontal position. The lever 18 yieldingly supports the plate 17 in its elevated position, as shown in full lines in Fig. 2, by reason of an upward pressure against the lever, at a point relatively close to the pin 19, by a roller 30 that is mounted near one end of a lever 31 supported below the lever 18 by a horizontal pivot pin 32. One or more weights 33 are mounted at the end of the lever 31 opposite the roller so as to cause the roller to bear upwardly with sufficient pressure to support the plate 17. Downward movement of the lever 31 under influence of the weights 33, is limited by engagement of the lever with the cross bar 22, as shown in Fig. 2. A proper balance of the plate 17 is effected through the adjustment of a tension adjusting spring 25, which is attached to the end of the lever 31 which extends beyond the roller 30 and to a tensioning bolt 26 that is threaded through a nut 27 rotatably retained within a slot 28 in the side wall of the base ring 15. Rotation of the nut moves the bolt upwardly or downwardly and thereby varies the tension exerted by the spring.

Pivotally mounted by a cross pin 35 at the end of the lever 31 which carries the weights 33, is a pawl 36. This pawl has a rounded cam surface 36a at its upper end which is adapted to be engaged by the swinging end of lever 18 when the latter moves downwardly. At its lower end, the pawl has a hook 37 adapted to hook over one end of a latch lever 38 that is carried by a pivot pin 39; the outer end of the latch being connected with a pull rod, or link, 40, which extends upwardly within the standard 13 and, at its upper end, is connected with a lever 41 supported by a pin 42 and extended laterally from the standard for actuating a valve stem, as will presently be described for effecting the delivery of water.

Normally the parts are in the relationship, as shown in Fig. 2, but when a glass 12 is placed on the plate 17, its weight depresses the plate to a certain extent thereby causing the lever 18 to swing downwardly and by this movement to cause the weighted end of the lever 31 to swing upwardly. The pawl hook 37 at the end of lever 31, through its connection with the lever pulls downwardly on the rod 40 and this in turn causes the valve actuating lever 41 to swing upwardly for opening the valve as will now be described.

Mounted within the housing 1 is a valve cylinder 45 which is open at its lower end and is threaded at this end into the opening of the nipple 8. This valve cylinder is closed at its upper end by a plug 46 and has openings 47 in its side walls, and has delivery ports 48 near its lower end through which water is discharged, when the valve is open, from the housing 1 through the nipple 8 and spout 11 to the glass, or receptacle, which is to be filled.

Slidably within the cylinder 45 is a valve piston 50. This extends well across the openings 47 of the cylinder and has a limited upward and downward movement; it being limited in its upward travel by engagement of its upper end with the plug 46, and being limited in its downward movement by engagement of its lower end with an annular seat, or shoulder, 52 formed within the lower end of the cylinder. The lower end portion of the piston is reduced in diameter so as to provide an annular downwardly facing shoulder 53 near its upper end.

The piston 50 is of tubular form and is closed at its lower end by a plug 54, having a central outlet, or port, 54a through which there is extended a valve stem 55. This is smaller than the opening to provide clearance for flow of water about it and it is provided with a valve seat 56 which is adapted to close downwardly against the outlet to prevent outward flow of water from within the piston. The lower end of the valve stem 55 rests against a head 41a at the end of lever 41.

The plug 46 which closes the upper end of the cylinder has a centrally depending stem portion 46a that is extended axially within the tubular upper end of the piston leaving a clearance space between them, and within the lower end of this stem portion is a vertical channel 58 that is adapted to receive therein the upper end portion of the valve stem 55 when the latter is lifted upwardly by the upwardly swinging action of the lever 41.

The upper end of the channel 58 opens laterally from the stem 46a and there is another channel 60 leading from the upper end of the plug 46 and opening into the channel 58 at a point that will be covered by the upper end of the valve stem 55 when the latter is lifted upwardly.

With the housing and valve so constructed, water under pressure always fills the housing, and it also fills the cylinder and piston by reason of the channels 60 and 58. Internal pressure in the piston and cylinder normally holds the valve 56 seated and also urges the valve piston downwardly so that its lower end closes the ports 48 and prevents any water from being discharged.

Assuming the parts to be so constructed, the operation of the device would be as follows: Starting with the various parts in the relative positions as shown in full lines in Fig. 2, should it be desired to fill a glass with water, the glass is placed on the plate 17. The weight of the glass depresses the plate and thereby moves its supporting lever 18 downwardly. Downward movement of the lever 18 causes an upward swinging of the weighted end of lever 31 and this, through the connection of the pawl 36 with the latch lever 38 causes the rod 40 to be pulled downwardly and the outer end of the valve trip lever 41 to swing upwardly and thereby lift the valve stem 55 and to cause the upper end of the stem to be projected into the channel 58 of the plug 46. When the valve stem is thus lifted, its upper end portion closes off the inner end of the channel 60 and thus prevents admittance of water to the interior of the piston through passages 60 and 58. At the same time, it lifts the valve seat 56 off of the outlet port 54 and allows the water that is then contained within the piston to escape. As soon as pressure within the piston is relieved by reason of the escape of the water therefrom, the piston will be moved upwardly due to the pressure of the water contained about the cylinder bearing upwardly against the annular shoulder 53 of the piston. This upward movement of the piston uncovers the ports 48 and water will be discharged through these ports and end of the cylinder, through spout 11 to fill the glass.

The various levers within the base of the device are so arranged that the weight of the glass just moves the lever 18 downwardly until its upwardly curved end portion 18a comes in contact with the rounded cam surface 36a of the pawl 36, as shown in dotted lines in Fig. 2, but when the glass becomes filled with water to a predetermined level the weight of the glass and water then causes the end 18a of the lever 18 to move downwardly along the cam surface 36a of the pawl and to rock the pawl so that the hooked end portion 37 will be released from the latch lever 38 and by reason of this the lever 41 will be permitted to drop downwardly to the full line position in Figure 2. When the lever 41 drops, it no longer supports the valve stem 55 and the action of the water being discharged from the housing through the openings 48 and the lower end of the cylinder moves the stem downwardly. This movement opens the channel 60 and seats the valve 56 against the outlet 54a. As soon as this action takes place, water under pressure again enters the cylinder through the channels 58 and 60 and drives the piston to its lower limit to again close the outlet channels 48. In order to insure the downward movement of the valve stem by the action of the water being discharged, I have placed a collar 65 about the lower end portion of the stem against which the discharged water impinges.

As soon as the filled glass is removed from the plate 17, the weights 33 cause the parts to be reset; the lever 31 moving downwardly under influence of the weights causes the pawl hook 37 to again hook beneath the latch lever 38 and the roller 30 at the other end of lever 31 cooperates with the spring 25 to move the lever 18 to raise the plate 17 to normal position.

The tensioning spring 25 and nut 27 permits an accurate regulation of the mechanism for the accommodation of glasses of different weight, and weights 33 of suitable size may be utilized to properly balance the plate and levers so that the operation will be properly carried out as heretofore described.

Having thus described my invention what I claim as new therein and desire to secure by Letters-Patent, is:

1. A liquid dispensing means comprising a housing for containing liquid under pressure, a valve mechanism associated therewith for controlling the discharge of liquid from the housing; said valve being actuated between open and closed positions by pressure of the liquid, a yieldably supported base on which a receptacle may be placed for filling, and means operable by movement of the base for controlling the valve movement.

2. A liquid dispensing means comprising a housing for containing a liquid under pressure, a valve mechanism associated therewith for controlling discharge of liquid from the housing, a yieldably mounted support and mechanism actuated by movement of the support incident to the placing of a receptacle thereon to effect opening of the valve to discharge liquid to the receptacle and operable by a subsequent movement incident to filling of the receptacle to effect the closing of the valve.

3. A liquid dispensing means comprising a housing adapted to contain liquid under pressure, a valve mechanism associated with the housing for controlling the delivery of liquid therefrom, a yieldably supported plate on which a receptacle may be placed for filling, means movable by the plate and operatively associated with the valve mechanism whereby the valve will be caused to open incident to an initial depression of the plate under weight of the receptacle placed thereon for filling, and which will cause the valve to close incident to a predetermined depression of the plate.

4. A liquid dispensing device comprising a housing for containing liquid under pressure, a discharge spout for the housing, mechanism within the housing for controlling the delivery of liquid through said spout and embodying a movable valve element operable between open and closed positions under the influence of the pressure medium, a yieldable mounted support on which a receptacle may be supported for filling and linkage operatively connecting the support with the control mechanism whereby initial movement of the support, by reason of weight of a receptacle placed thereon for filling, effects the release of pressure from one side of the valve member to cause it to move to open position, and a farther depression of the plate incident to weight of liquid received therein, effects the application of pressure to the other side of the valve for closing it.

5. A liquid dispensing device comprising a housing connected with a source of liquid under pressure, a valve mechanism associated therewith for controlling discharge of liquid from the housing and including a movable valve member against which the pressure medium is applied unequally at opposite sides to normally retain the member in closed position, and a pressure release member operable to relieve the pressure which holds the valve closed, a movable support for a receptacle to be filled and means operatively connecting the support with the pressure relief member whereby initial movement of the support effects movement of the pressure relief member to cause opening of the valve, and a subsequent movement of the support under weight of the filled receptacle effects the closing of the relief and causes application of pressure to close the valve.

Signed at Tacoma, Washington, this 6th day of February, 1930.

ARTHUR LOCKE.